(12) United States Patent
Stancu et al.

(10) Patent No.: US 7,042,186 B2
(45) Date of Patent: May 9, 2006

(54) DECOUPLING A HARMONIC SIGNAL FROM A SIGNAL PATH

(75) Inventors: Constantin C. Stancu, Anaheim, CA (US); Silva Hiti, Redondo Beach, CA (US); Steven E. Schulz, Torrance, CA (US); Nitinkumar R. Patel, Cypress, CA (US)

(73) Assignee: General Motors Corporation, Detroit, MI (US)

( * ) Notice: Subject to any disclaimer, the term of this patent is extended or adjusted under 35 U.S.C. 154(b) by 240 days.

(21) Appl. No.: 10/720,626

(22) Filed: Nov. 24, 2003

(65) Prior Publication Data

US 2005/0110450 A1    May 26, 2005

(51) Int. Cl.
*G05B 11/36* (2006.01)

(52) U.S. Cl. ............... 318/609; 318/610; 318/621; 318/799; 318/809

(58) Field of Classification Search ............... 318/609
See application file for complete search history.

(56) References Cited

U.S. PATENT DOCUMENTS

| | | | | |
|---|---|---|---|---|
| 5,565,752 A | * | 10/1996 | Jansen et al. | 318/807 |
| 5,585,709 A | * | 12/1996 | Jansen et al. | 318/807 |
| 6,069,467 A | * | 5/2000 | Jansen | 318/802 |
| 6,388,420 B1 | * | 5/2002 | Jansen et al. | 318/799 |
| 6,628,099 B1 | * | 9/2003 | Iwaji et al. | 318/700 |
| 2003/0057912 A1 | * | 3/2003 | Iwaji et al. | 318/700 |

OTHER PUBLICATIONS

Ha/Sul, "Sensorless Field-Orientation Control of an Induction Machine by High-Frequency Signal Injection", IEEE Transactions on Industry Applications, vol. 35, No. 1, Jan./Feb. 1999, pp. 45-51.

Ha/Sul/Ide/Murokita/Sawamura, "Physical Understanding of High Frequency Injection Method to Sensorless Drives of an Induction Machine", Conference Record of the 2000 IEEE Industry Applications Conference, pp. 1802-1808.

* cited by examiner

*Primary Examiner*—David Martin
*Assistant Examiner*—Renata McCloud
(74) *Attorney, Agent, or Firm*—Christopher DeVries

(57) ABSTRACT

A method for decoupling a harmonic signal from an input signal wherein the harmonic signal is harmonic relative to a signal other than the input signal. An angular position of the other signal is multiplied by a value representing the harmonic to obtain an angular position multiple. A harmonic decoupling block uses the angular position multiple to obtain correction signals representing the harmonic signal, and subtracts the correction signals from the input current to decouple the harmonic signal from the input signal. This method is useful for decoupling unwanted harmonics from currents into which high-frequency signals have been injected for control of electric motors.

21 Claims, 4 Drawing Sheets

DECOUPLING A HARMONIC SIGNAL FROM A SIGNAL PATH

FIELD OF THE INVENTION

The present invention relates to decoupling a harmonic signal from a signal path in an electrical or electromechanical circuit, and more particularly to decoupling a harmonic signal from an input signal wherein the harmonic signal is harmonic relative to a signal other than the input signal.

BACKGROUND OF THE INVENTION

In an induction motor, a rotor is mounted in a stator and is separated from the stator by an air gap. During operation of the motor, alternating currents supplied to windings of the stator induce currents in windings of the rotor. Due to magnetic material saturation, leakage inductance from the stator tends to be lower in regions in which rotor magnetic flux circulates than in regions in which rotor flux is not present. Because rotor magnetic flux direction is associated with a direct axis (d-axis), quadrature axis (q-axis) leakage inductance is lower than direct axis leakage inductance.

It is known to control the operation of an induction machine based on variation of rotor inductance. In at least one known method that has been proposed for use with pulse-width modulation (PWM) inverter-controlled motors, a fluctuating signal to the motor is injected in a synchronously rotating reference frame. The fluctuating signal is a high frequency voltage or current, for example, on the order of a few hundred Hertz, in addition to other voltages required by the motor for normal operation. An impedance difference between the flux axis and the orthogonal axis is then observed. The high-frequency voltage or current magnitude can be used as an error signal that can drive a PI (Proportional-Integral) controller that estimates flux angular velocity and position. If the high-frequency signal is injected in an estimated d-axis where the leakage inductance is at a minimum, the high-frequency current should be at a maximum. In an orthogonal axis, the high frequency current should be zero, corresponding to a region of maximum inductance.

For example, in one known controller configuration numbered generally as 20 in FIG. 1, a high frequency control signal is used as an error signal in estimating flux angular velocity and flux angle. Motor stator currents $i_\alpha$ and $i_\beta$ in a stationary reference frame are transformed at block 22 into an estimated flux reference frame, which is synchronously rotating with angular speed $\omega_e$. The current $i_{qm}$ has a DC component corresponding to the value of torque current and a high frequency component corresponding to injection voltage injected at a multiplier block 26. The injection voltage signal is useful for estimating $\omega_e$ and $\theta_e$, a stator flux angle used in vector control of the machine. In addition to these known components, $i_{qm}$ may contain a component at $6\omega_e$ due to imperfect dead-time compensation and a component at $2\omega_e$ due to unbalanced gain in the measurement of $i_\alpha$ and $i_\beta$. A component at the stator frequency $\omega_e$ could also be present if current sensor offset is not properly compensated.

To eliminate these unwanted components as well as the DC component from the injection component, there is provided a band-pass filter (BPF) 24 tuned at the injection frequency $\omega_i$. However, if BPF 24 is too selective (i.e., has a high quality factor Q), it can reduce the dynamic performance of the estimation block. In many configurations, then, a quality factor Q lower than 1 is used for dynamic reasons. Consequently, unwanted harmonics of $i_{qm}$ still can be introduced in the signal path.

An open loop configuration is generally used to eliminate such harmonic components. For example, harmonic components $\hat{A} \sin(6\omega_e t + \hat{\phi}_6)$ and $\hat{B} \sin(2\omega_e t + \hat{\phi}_2)$ are determined as further described below and are removed by adders 28 and 30. The resulting signal is averaged to an essentially DC component by a low-pass filter (LPF) 32, the result of which is passed through a proportional integrator (PI) controller or regulator 34. An estimate of flux angular speed $\omega_{e\_est}$ is added by an adder 36. This estimate is obtained from a vector control system (not shown) utilizing a slip angular speed estimate $\omega_{slip\_est}$ and a rotor speed estimate $\omega_{r\_est}$. The result, $\omega_e$, is integrated by an integrator 38 to obtain a stator flux angle $\theta_e$ that is used in vector control of the machine.

The components $\hat{A} \sin(6\omega_e t + \hat{\phi}_6)$ and $\hat{B} \sin(2\omega_e t + \hat{\phi}_2)$ obtained by carefully mapping amplitudes $\hat{A}$ and $\hat{B}$ as well as their phase shifts $\hat{\phi}_6$ and $\hat{\phi}_2$ as functions of the operating torque of the motor. This mapping can take considerable time. Moreover, harmonic components can change as a function of variables (such as motor temperature and inverter temperature) that are difficult to take into account. Thus, accuracy of the result can be adversely affected.

SUMMARY OF THE INVENTION

The present invention, in one embodiment, is directed to a method for decoupling a harmonic signal from an input signal wherein the harmonic signal is harmonic relative to a signal other than the input signal. The method includes multiplying an angular position of the other signal by a value representing the harmonic to obtain an angular position multiple. The input signal and a sine of the angular position multiple are multiplied to obtain a first product signal. The input signal and a cosine of the angular position multiple are multiplied to obtain a second product signal. The first and second product signals are filtered to obtain a DC cosine signal and a DC sine signal. The DC cosine signal is multiplied by twice the sine of the angular position multiple to obtain a first correction signal. The DC sine signal is multiplied by twice the cosine of the angular position multiple to obtain a second correction signal. The correction signals are subtracted from the input signal.

In another embodiment, the invention is directed to a system for decoupling a harmonic signal from an input signal wherein the harmonic signal is an Nth harmonic relative to a signal other than the input signal. The system includes a multiplier that multiplies an angular position of the other signal by N to obtain an angular position multiple. A first sine multiplier multiplies the input signal and a sine of the angular position multiple to obtain a first product signal. A first cosine multiplier multiplies the input signal and a cosine of the angular position multiple to obtain a second product signal. A first filter filters the first product signal to obtain a first DC signal. A second filter filters the second product signal to obtain a second DC signal. A second sine multiplier multiplies the first DC signal by twice the sine of the angular position multiple to obtain a first correction signal. A second cosine multiplier multiplies the second DC signal by twice the cosine of the angular position multiple to obtain a second correction signal. An adder subtracts the correction signals from the input signal.

In another embodiment, a method is described for decoupling a harmonic signal from a current input to a motor, wherein the harmonic signal is an Nth harmonic relative to a flux angular speed of the motor. The method includes integrating the flux angular speed to obtain a flux angular position. The angular position is multiplied by N to obtain an angular position multiple. The input current and a sine of the angular position multiple are multiplied to obtain a first product signal. The input current and a cosine of the angular position multiple are multiplied to obtain a second product signal. The first and second product signals are filtered to obtain a DC cosine signal and a DC sine signal. The DC cosine signal is multiplied by twice the sine of the angular position multiple to obtain a first correction signal. The DC sine signal is multiplied by twice the cosine of the angular position multiple to obtain a second correction signal. The correction signals are subtracted from the input current.

In another embodiment, a control system for controlling an electric motor includes a pulse-width modulation (PWM) controller that injects a control signal into an input current to the motor. A proportional-plus-integral (PI) controller is driven by the control signal to estimate a flux angular speed of the motor. An integrator integrates the estimated flux angular speed to estimate a flux angular position. A harmonic decoupling block uses the estimated flux angular position to obtain a plurality of correction signals representing a harmonic signal that is harmonic relative to the estimated flux angular speed, and subtracts the correction signals from the input current to decouple the harmonic signal from the input current.

In yet another embodiment, a method for controlling an electric motor includes injecting a control signal into an input current to the motor to drive a proportional-plus-integral (PI) controller to estimate a flux angular speed of the motor. The estimated flux angular speed is integrated to estimate a flux angular position. The estimated flux angular position is used to obtain a plurality of correction signals representing a harmonic signal that is harmonic relative to the estimated flux angular speed. The correction signals are subtracted from the input current to decouple the harmonic signal from the input current.

In still another embodiment, a motor apparatus has an electric motor and a controller that injects a control signal into an input current to the motor. The motor apparatus includes a proportional-plus-integral (PI) controller driven by the control signal to estimate a flux angular speed of the motor, an integrator that integrates the estimated flux angular speed to estimate a flux angular position, and a harmonic decoupling block that uses the estimated flux angular position to obtain a plurality of correction signals representing a harmonic signal that is harmonic relative to the estimated flux angular speed, and subtracts the correction signals from the input current to decouple the harmonic signal from the input current.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of various embodiments is merely exemplary in nature and is in no way intended to limit the invention, its application, or uses. Although embodiments of the present invention are described in connection with induction motors and induction motor control systems, it should be understood that the invention is not so limited. Embodiments are contemplated for use in connection with many different types of electrical and electromechanical circuits and systems wherein it is desired to decouple a harmonic signal from a signal path.

Figure 1:
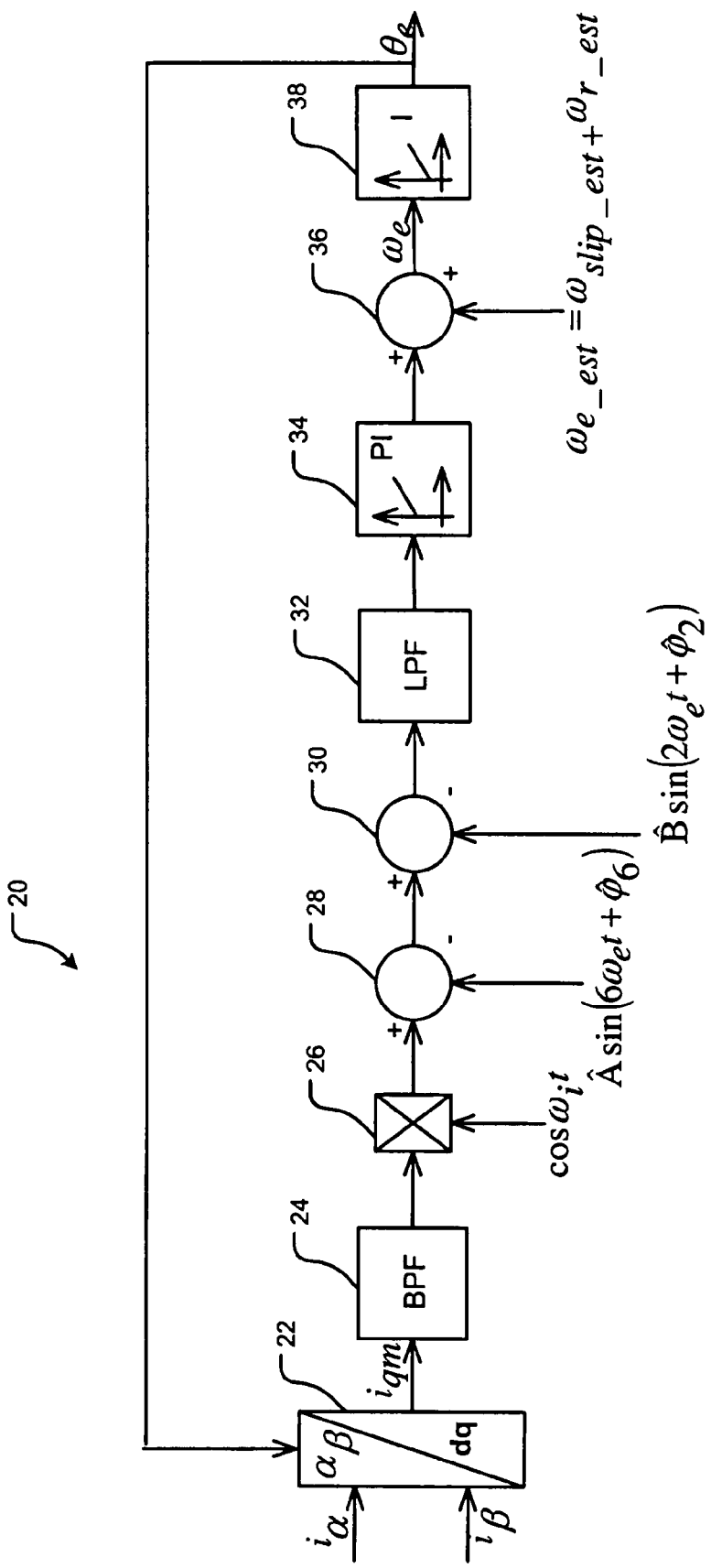
FIG. 1 is a diagram of a known configuration for estimating stator flux position.
Figure 2:
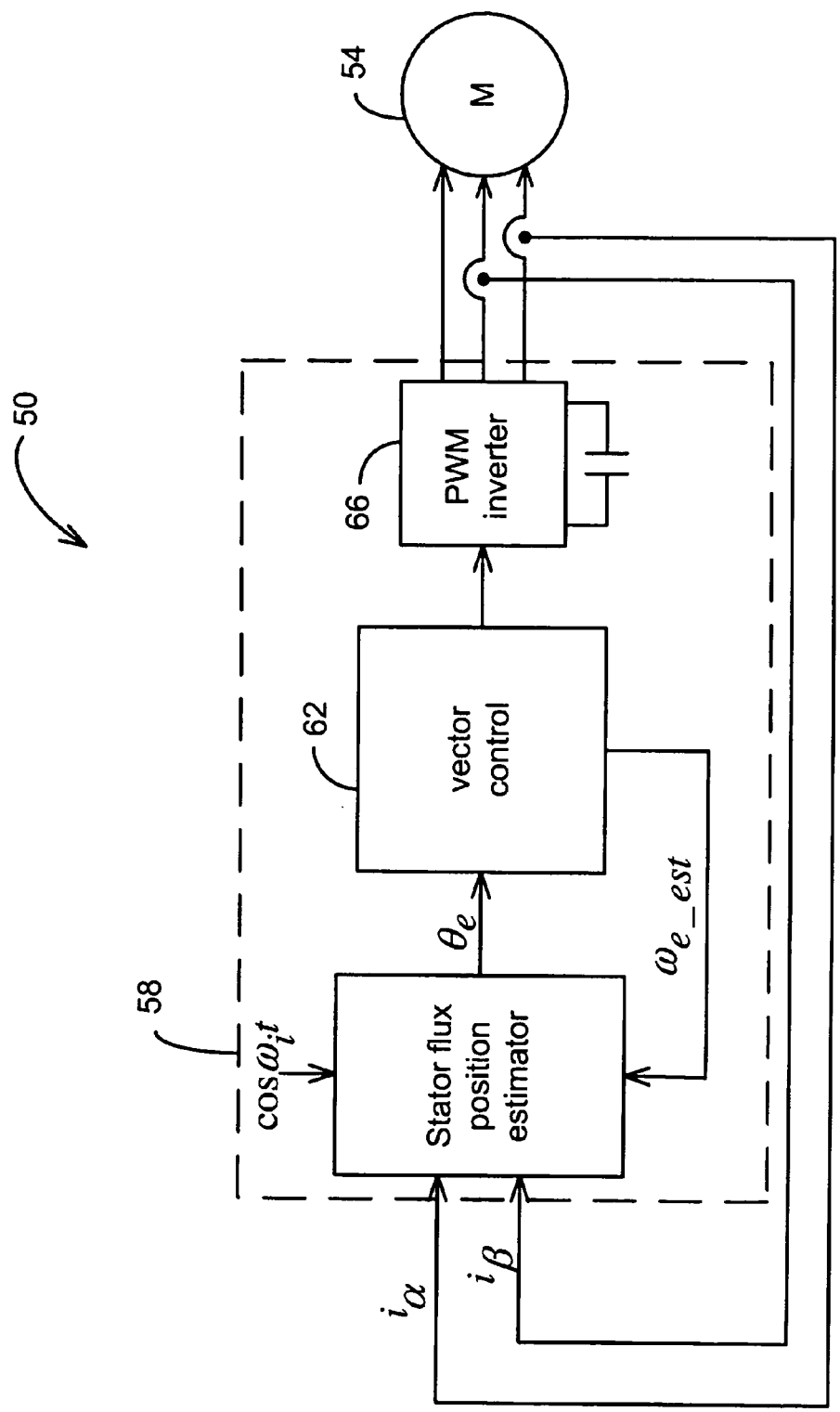
FIG. 2 is a diagram of a motor apparatus according to one embodiment of the present invention.

A motor apparatus according to one embodiment of the present invention is indicated generally in FIG. 2 by reference number 50. A motor 54, for example, an induction motor, is driven via a pulse-width modulation (PWM) controller 58. The controller 58 includes a stator flux position estimator 100 into which is injected a high-frequency signal as further described below. Motor stator input currents $i_\alpha$ and $i_\beta$ are input to the stator flux position estimator 100, which estimates a stator flux position $\theta_e$ for use by a vector control system 62. The vector control system 62 inputs control vectors to a PWM inverter 66 that drives three-phase current to the motor 54. As further described below, the stator flux position estimator 100 uses an estimate of flux angular speed $\omega_{e\_est}$, output by the vector control system 62, to estimate the stator flux position $\theta_e$.

Figure 3:
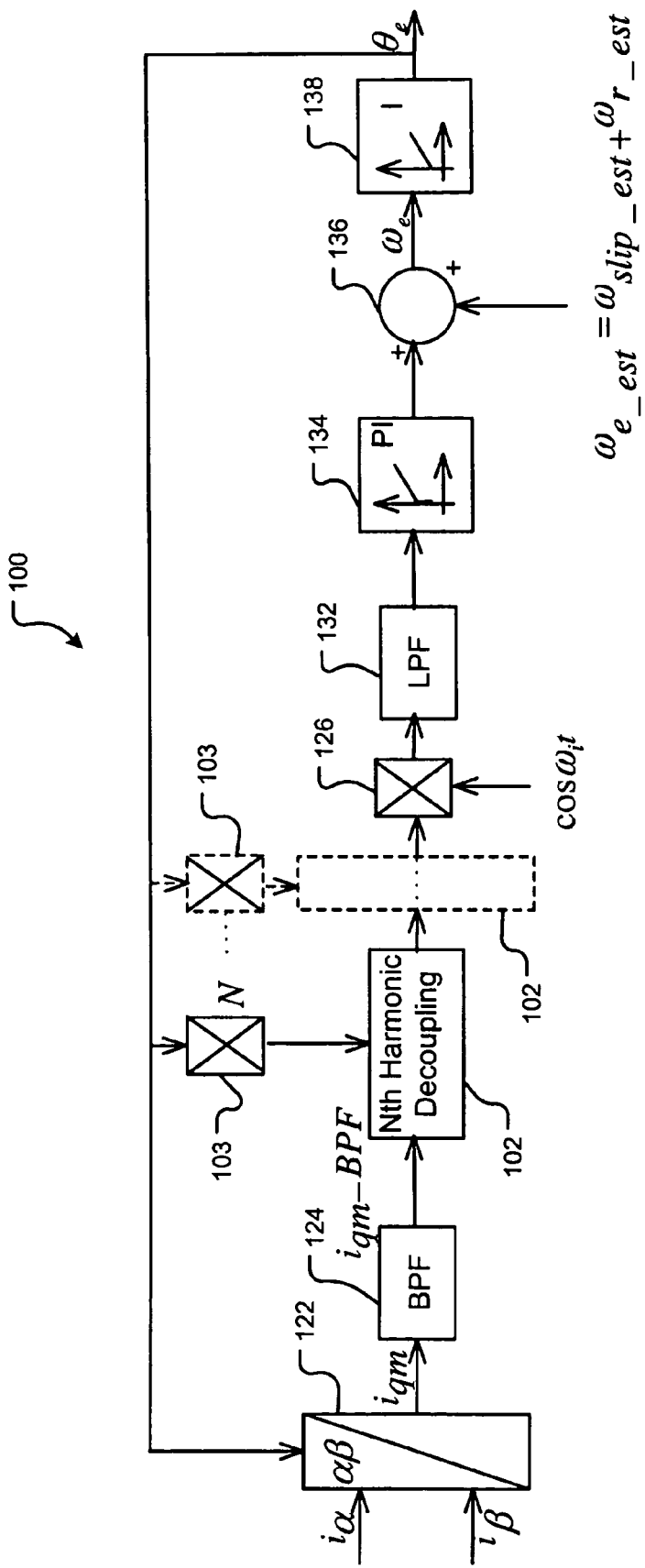
FIG. 3 is a diagram of a control system for estimating stator flux position according to one embodiment of the present invention.

The stator flux position estimator 100 is shown in greater detail in FIG. 3. In some configurations of the present invention and referring to FIG. 3, one or more harmonics are eliminated or reduced in the stator flux position estimator 100 through the use of one or more harmonic decoupling blocks as further described below. Motor stator currents $i_\alpha$ and $i_\beta$ in a stationary reference frame are transformed at a block 122 into an estimated flux reference frame, which is synchronously rotating with angular speed $\omega_e$. Current $i_{qm}$ is filtered by a band-pass filter (BPF) 124 to produce a current $i_{qm\_BPF}$.

As further described below, one or more harmonic signals can be decoupled from the signal $i_{qm\_BPF}$ via one or more decoupling blocks 102, each of which receives input from an associated multiplier 103. An injection frequency $\cos\omega_i t$ is injected at a multiplier 126. The resulting signal is filtered to an essentially DC component by a low-pass filter (LPF) 132, the result of which is passed through a proportional integrator (PI) controller or regulator 134. The estimate of flux angular speed $\omega_{e\_est}$ is added by an adder 136. This estimate is obtained from the vector control system 62 utilizing a slip angular speed estimate $\omega_{slip\_est}$ and a rotor speed estimate $\omega_{r\_est}$. The result, flux angular frequency $\omega_e$, is integrated by an integrator 138 to obtain the stator flux angle $\theta_e$, used in vector control of the motor 54 by the vector control system 62. The flux angle $\theta_e$ is fed back to transformation block 122 and, via one or more multipliers 103, to one or more harmonic decoupling blocks 102.

Figure 4:
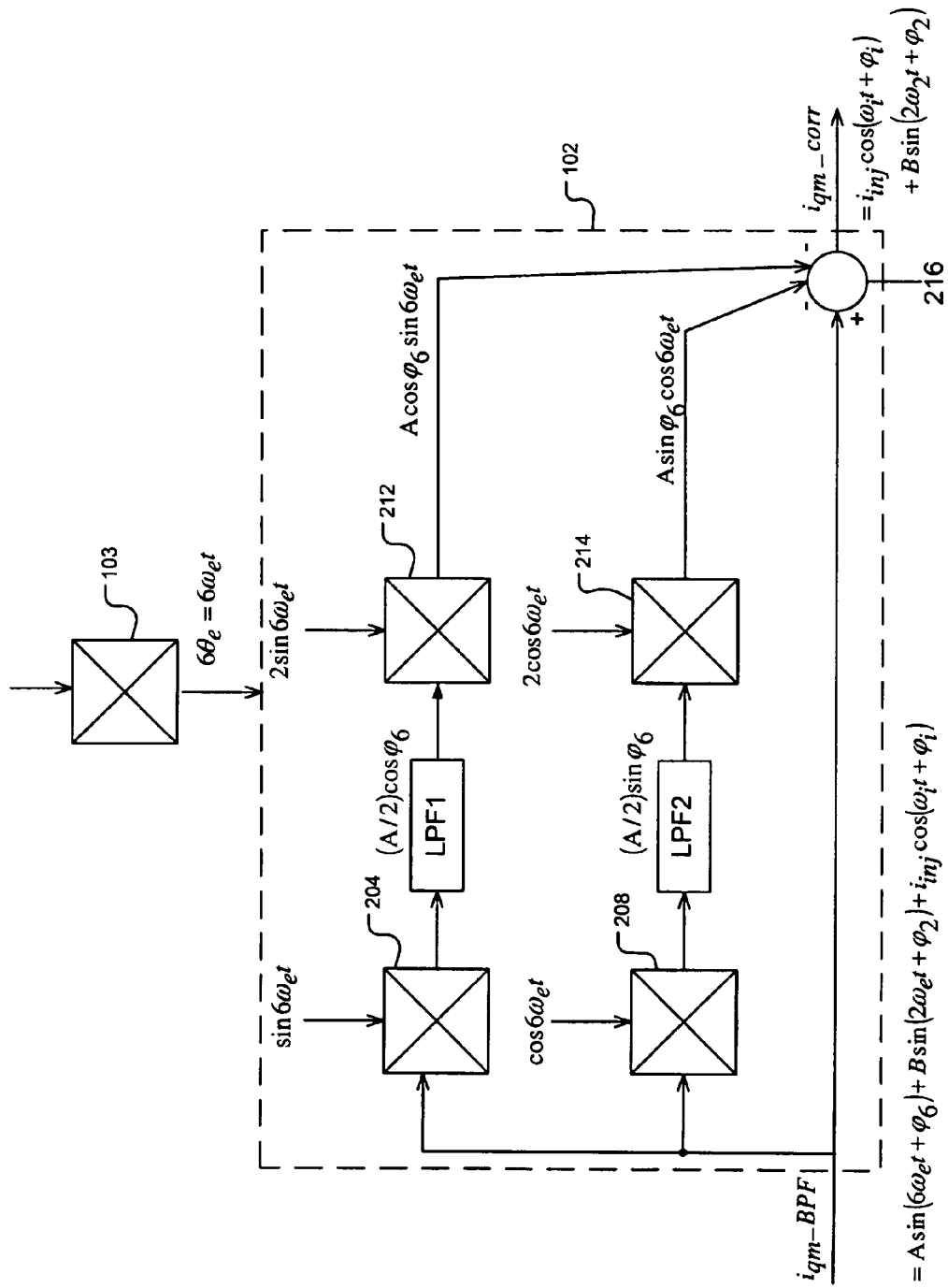
FIG. 4 is a diagram of a harmonic decoupling block according to one embodiment of the present invention.

As shown in FIG. 3, an Nth harmonic decoupling block 102 is used to decouple a signal that is an Nth harmonic relative to the signal representing angular speed, $\omega_e$. The current $i_{qm\_}$BPF is applied as an input current to at least one harmonic decoupling block 102, one of which is shown in FIG. 4. The current $i_{qm\_}$BPF can be expressed, for example, as $$i_{qm\_}BPF = A\sin(6\omega_e t + \phi_6) + B\sin(2\omega_e t + \phi_2) + i_{inj}\cos(\omega_i t + \phi_i)$$

where $i_{inj}\cos(\omega_i t + \phi_i)$ represents useful information at the injected frequency, $A\sin(6\omega_e t + \phi_6)$ represents an unwanted sixth harmonic relative to the flux angular frequency signal $\omega_e$ output at block 136, and $B\sin(2\omega_e t + \phi_2)$ represents an unwanted second harmonic relative to the signal $\omega_e$. The exemplary block 102 shown in FIG. 4 is configured for decoupling a sixth harmonic signal. At the multiplier 103, the flux angle $\theta_e$ feedback signal is multiplied by the harmonic value to obtain $6\theta_e$, i.e., $6\omega_e t$. The input signal $i_{qm\_}$BPF is multiplied in parallel by $\sin 6\omega_e t$ at a multiplier 204 and by $\cos 6\omega_e t$ at a multiplier 208. The multiplier 204 produces a signal:

$$A\sin(6\omega_e t + \phi_6)\sin(6\omega_e t) + B\sin(2\omega_e t + \phi_2)\sin(6\omega t) + i_{inj}\cos(\omega_i t + \phi_i)\sin(6\omega_e t),$$

which is filtered at a low-pass filter LPF1 to obtain essentially a DC signal $(A/2)\cos(\phi_6)$. Similarly, by multiplying at multiplier 208 and filtering using a low-pass filter LPF2, a signal $(A/2)\sin(\phi_6)$ is obtained. The filters LPF1 and LPF2 are conventional filters, e.g., Butterworth and/or Chebyshev filters having poles configured in accordance with the highest dynamic of a signal expected in $i_{inj}$. After multiplication by $2\sin(6\omega_e t)$ and $2\cos(6\omega_e t)$ at multipliers 212 and 214, respectively, two correction signals are obtained, namely, $A\cos\phi_6\sin 6\omega_e t$ and $A\sin\phi_6\cos 6\omega_e t$. The correction signals are subtracted from $i_{qm\_}$BPF at an adder 216, which results in a signal $i_{qm\_}$corr:

$$i_{qm\_}corr = i_{inj}\cos(\omega_i t + \phi_i) + B\sin(2\omega_e t + \phi_2).$$

Thus, the unwanted sixth harmonic $A\sin(6\omega_e t + \phi_6)$ is decoupled from the signal $i_{inj}\cos(\omega_i t + \phi_i) + B\sin(2\omega_e t + \phi_2)$. In a similar manner, another decoupling block 102 and associated multiplier 103 wherein N equals two (2) can be used to decouple the signal $B\sin(2\omega_e t + \phi_2)$ from the useful signal $i_{inj}\cos(\omega_i t + \phi_i)$.

The effectiveness of configurations of the present invention in decoupling a sixth harmonic component due to dead-time compensation has been tested. At higher motor operating frequencies, this component can be close to an injection component and interfere with useful information contained in the injection signal. This component was effectively decoupled. In some configurations of the present invention, additional harmonic components having frequencies $f_{i6} = f_i \pm f_{6e}$ are decoupled to further reduce interference with an injection component signal utilizing circuitry similar to that used to decouple a sixth harmonic component.

Advantageously, configurations of the present invention do not require special mapping or tuning of the decoupling circuitry. As many harmonic decoupling block configurations as deemed necessary can be cascaded to reduce the effect of unwanted harmonics. Delays introduced by these blocks are minimal in some configurations, thereby requiring no mapping of the parameters of the decoupling blocks.

It will be appreciated that configurations of the present invention provide faster tuning of sensorless control algorithms and insensitivity to parameter variation from inverter to inverter and to temperature variations. In addition, unlike synchronous reference frame filters, embodiments of the present invention do not need a full three-phase signal sequence in order to work. A harmonic signal can be decoupled without a priori knowledge of its amplitude and/or phase. It also will be appreciated that various configurations of the present invention advantageously do not require special mapping or tuning. Embodiments of the present invention can be utilized in a wide range of applications, wherever a signal is to be decoupled from a multiple component spectrum of frequencies.

Those skilled in the art can now appreciate from the foregoing description that the broad teachings of the present invention can be implemented in a variety of forms. Therefore, while this invention has been described in connection with particular examples thereof, the true scope of the invention should be not so limited since other modifications will become apparent to the skilled practitioner upon a study of the drawings, specification, and the following claims.

What is claimed is:

1. A method for decoupling a harmonic signal from an input signal wherein the harmonic signal is harmonic relative to a signal other than the input signal, said method comprising:

multiplying an angular position of the other signal by a value representing the harmonic to obtain an angular position multiple;

multiplying the input signal and a sine of said angular position multiple to obtain a first product signal;

multiplying the input signal and a cosine of said angular position multiple to obtain a second product signal;

filtering said first and second product signals to obtain a DC cosine signal and a DC sine signal;

multiplying said DC cosine signal by twice said sine of said angular position multiple to obtain a first correction signal;

multiplying said DC sine signal by twice said cosine of said angular position multiple to obtain a second correction signal; and subtracting said correction signals from the input signal.

2. The method of claim 1 further comprising integrating the other signal to obtain the angular position.

3. The method of claim 1 wherein said harmonic value is selected from the group consisting of 1, 2, 6, and multiples thereof.

4. The method of claim 1 performed a plurality of times and for more than one harmonic value.

5. A system for decoupling a harmonic signal from an input signal wherein the harmonic signal is an Nth harmonic relative to a signal other than the input signal, said system comprising:

a multiplier that multiplies an angular position of the other signal by N to obtain an angular position multiple;

a first sine multiplier that multiplies the input signal and a sine of said angular position multiple to obtain a first product signal;

a first cosine multiplier that multiplies the input signal and a cosine of said angular position multiple to obtain a second product signal;

a first filter that filters said first product signal to obtain a first DC signal;

a second filter that filters said second product signal to obtain a second DC signal;

a second sine multiplier that multiplies said first DC signal by twice said sine of said angular position multiple to obtain a first correction signal;

a second cosine multiplier that multiplies said second DC signal by twice said cosine of said angular position multiple to obtain a second correction signal; and an adder that subtracts said correction signals from the input signal.

6. The system of claim 5 further comprising an integrator that integrates the other signal to obtain said angular position.

7. The system of claim 5 wherein the input signal includes a current from a motor stator and the other signal includes a stator flux angular speed, said system further comprising an integrator that integrates the angular speed to obtain said angular position.

8. A method for decoupling a harmonic signal from a current input to a motor, wherein the harmonic signal is an Nth harmonic relative to a flux angular speed of the motor, said method comprising:
  integrating the flux angular speed to obtain a flux angular position;
  multiplying the angular position by N to obtain an angular position multiple;
  multiplying the input current and a sine of said angular position multiple to obtain a first product signal;
  multiplying the input current and a cosine of said angular position multiple to obtain a second product signal;
  filtering said first and second product signals to obtain a DC cosine signal and a DC sine signal;
  multiplying said DC cosine signal by twice said sine of said angular position multiple to obtain a first correction signal;
  multiplying said DC sine signal by twice said cosine of said angular position multiple to obtain a second correction signal; and
  subtracting said correction signals from the input current.

9. The method of claim 8 wherein the input current includes more than one harmonic signal, said method performed for each of the harmonic signals.

10. A control system for controlling an electric motor, said control system comprising:
  a pulse-width modulation (PWM) controller that injects a control signal into an input current to the motor;
  a proportional-plus-integral (PI) controller driven by the control signal to estimate a flux angular speed of the motor;
  an integrator that integrates the estimated flux angular speed to estimate a flux angular position; and
  a harmonic decoupling block that:
    uses the estimated flux angular position to obtain a plurality of correction signals representing a harmonic signal that is harmonic relative to the estimated flux angular speed; and
    subtracts the correction signals from the input current to decouple the harmonic signal from the input current.

11. The control system of claim 10 further comprising a plurality of harmonic decoupling blocks, wherein each said block decouples a corresponding harmonic signal from the input current.

12. The control system of claim 10 wherein said harmonic decoupling block comprises:
  a multiplier that multiplies the estimated flux angular position by a constant representing the harmonic of the harmonic signal to obtain an angular position multiple;
  a first sine multiplier that multiplies the input current and a sine of said angular position multiple to obtain a first product signal;
  a first cosine multiplier that multiplies the input current and a cosine of said angular position multiple to obtain a second product signal;
  a first filter that filters said first product signal to obtain a first DC signal;
  a second filter that filters said second product signal to obtain a second DC signal;
  a second sine multiplier that multiplies said first DC signal by twice said sine of said angular position multiple to obtain a first of said correction signals;
  a second cosine multiplier that multiplies said second DC signal by twice said cosine of said angular position multiple to obtain a second of said correction signals; and
  an adder that subtracts said correction signals from the input current.

13. The control system of claim 12 wherein said constant comprises one selected from the group consisting of 1, 2, 6, and multiples thereof.

14. A method for controlling an electric motor, said method comprising:
  injecting a control signal into an input current to the motor to drive a proportional-plus-integral (PI) controller to estimate a flux angular speed of the motor;
  integrating the estimated flux angular speed to estimate a flux angular position;
  using the estimated flux angular position to obtain a plurality of correction signals representing a harmonic signal that is harmonic relative to the estimated flux angular speed; and
  subtracting the correction signals from the input current to decouple the harmonic signal from the input current.

15. The method of claim 14 further comprising decoupling a plurality of harmonic signals from the input current.

16. The method of claim 14 further comprising:
  multiplying the estimated flux angular position by a constant representing the harmonic of the harmonic signal to obtain an angular position multiple;
  multiplying the input current and a sine of said angular position multiple to obtain a first product signal;
  multiplying the input current and a cosine of said angular position multiple to obtain a second product signal;
  filtering said first product signal to obtain a first DC signal and said second product signal to obtain a second DC signal;
  multiplying said first DC signal by twice said sine of said angular position multiple to obtain a first of said correction signals; and
  multiplying said second DC signal by twice said cosine of said angular position multiple to obtain a second of said correction signals.

17. The method of claim 14 performed using a PWM controller.

18. A motor apparatus having an electric motor and a controller that injects a control signal into an input current to the motor, said apparatus comprising:
  a proportional-plus-integral (PI) controller driven by the control signal to estimate a flux angular speed of the motor;
  an integrator that integrates the estimated flux angular speed to estimate a flux angular position; and
  a harmonic decoupling block that uses the estimated flux angular position to obtain a plurality of correction signals representing a harmonic signal that is harmonic relative to the estimated flux angular speed, and subtracts the correction signals from the input current to decouple the harmonic signal from the input current.

19. The motor apparatus of claim 18 further comprising a plurality of harmonic decoupling blocks, wherein each said block decouples a corresponding harmonic signal from the input current.

20. The motor apparatus of claim 18 wherein said harmonic decoupling block comprises:
- a multiplier that multiplies the estimated flux angular position by a constant representing the harmonic of the harmonic signal to obtain an angular position multiple;
- a first sine multiplier that multiplies the input current and a sine of said angular position multiple to obtain a first product signal;
- a first cosine multiplier that multiplies the input current and a cosine of said angular position multiple to obtain a second product signal;
- a first filter that filters said first product signal to obtain a first DC signal;
- a second filter that filters said second product signal to obtain a second DC signal;
- a second sine multiplier that multiplies said first DC signal by twice said sine of said angular position multiple to obtain a first of said correction signals;
- a second cosine multiplier that multiplies said second DC signal by twice said cosine of said angular position multiple to obtain a second of said correction signals; and
- an adder that subtracts said correction signals from the input current.

21. The motor apparatus of claim 20 wherein said constant comprises one selected from the group consisting of 1, 2, 6, and multiples thereof.

* * * * *